Patented Aug. 31, 1948

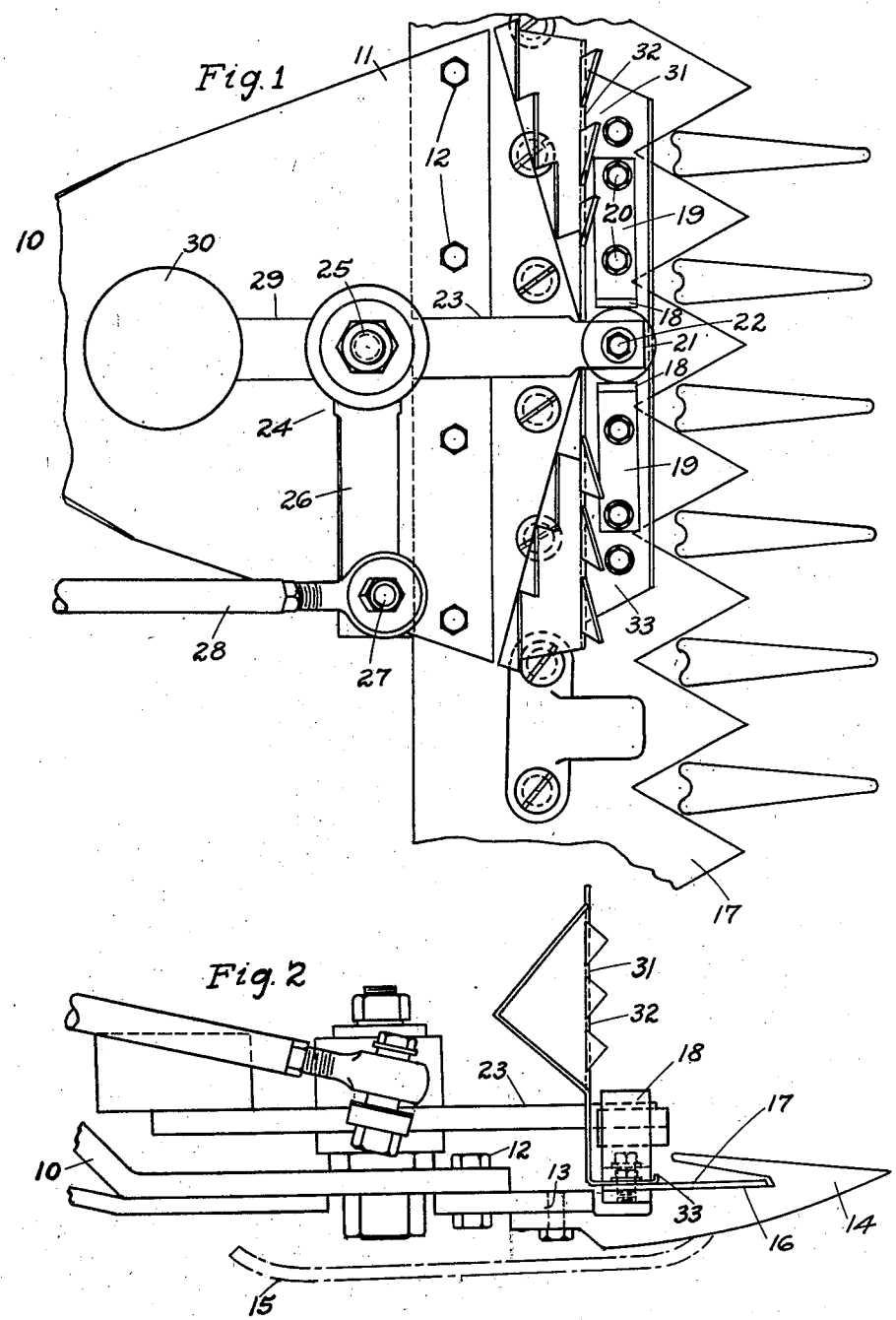

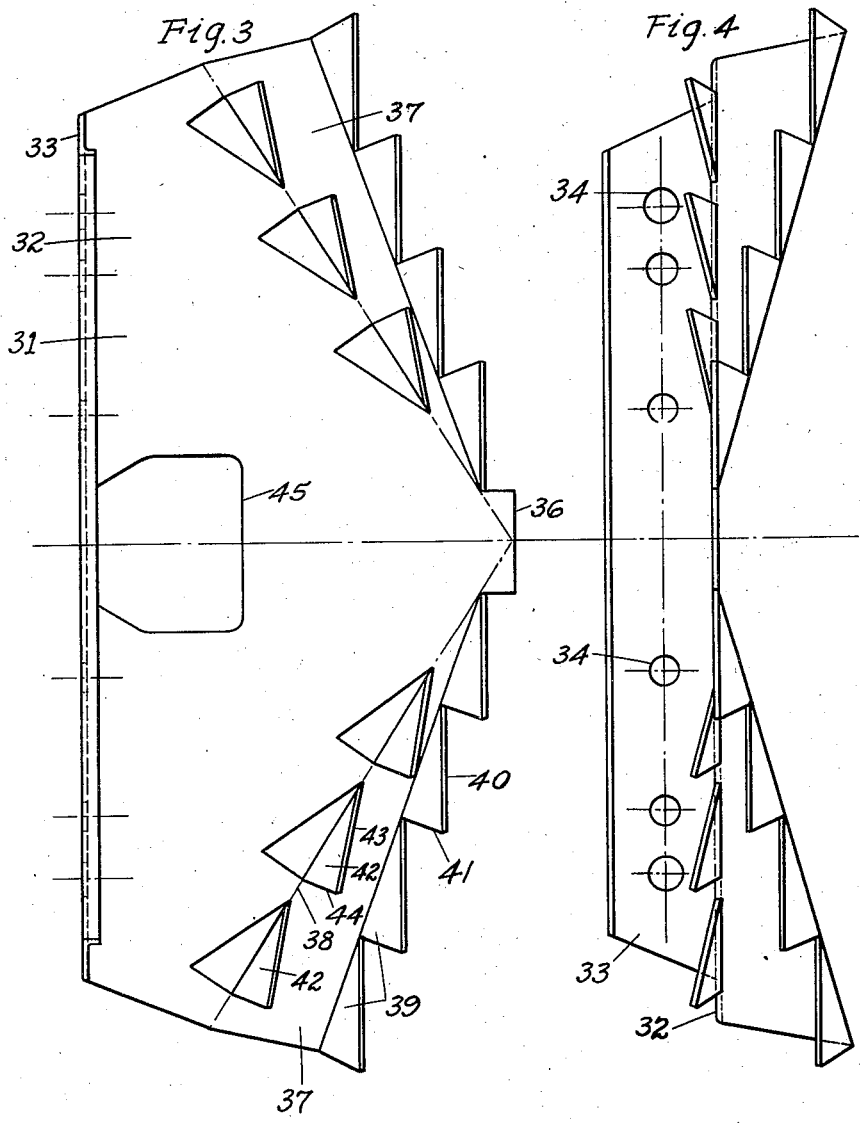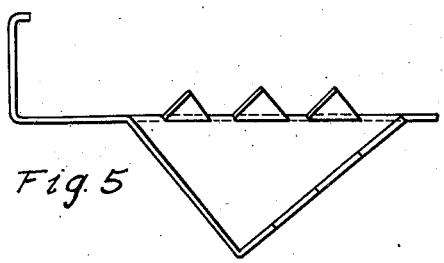

2,448,078

UNITED STATES PATENT OFFICE 2,448,078

RECIPROCATING TEDDER ATTACHMENT FOR POWER MOWER SICKLE BARS

Percy F. Brown, Greece, N. Y., assignor to James Cunningham, Son & Company, Rochester, N. Y., a partnership Application November 13, 1946, Serial No. 709,485

8 Claims. (Cl. 56—314)

This invention relates to reciprocating tedder attachments for the sickle bars of power mowing machines of the variety having a centrally located, forwardly projecting frame portion carrying a reciprocating sickle bar and its actuating connections. In the operation of such a machine, the long grass and weeds, after being cut, tend to fall and stack up on the forward end of the frame portion supporting the sickle bar and its connections, so that it is frequently necessary to stop the operation of the machine to avoid injury to the operator and remove the accumulated cuttings, in order to maintain the machine in satisfactory working condition.

Attempts have been made to overcome this difficulty by providing separating bars supported stationarily on the frame, or with a reciprocating motion, but such prior devices have generally proven inefficient and unsatisfactory in actual operation.

One object of the invention, therefore, is to provide an improved tedder attachment having a more simple, practical and efficient type of construction.

Another object is to supply such a device having a more active, positive and effective mode of operation for separating and discharging the cuttings to opposite sides of the machine.

A further object is the provision of such an attachment having a construction adapted to be readily installed for use with a minimum of labor or interference with other parts of the machine.

Still a further object is to afford an attachment having the above advantages and a construction consisting practically of a single part capable of being readily and economically pressed up from sheet metal and easily installed on a machine.

To these and other ends the invention resides in certain improvements and combinations of parts, all as will be hereinafter more fully described, the novel features being pointed out in the claims at the end of the specification.

In the drawings:

Fig. 1 is a fragmentary, top plan view of the forwardly projecting frame portion and sickle bar of a mowing machine carrying a tedder attachment embodying the present invention;

Fig. 2 is a side elevation of the parts shown in Fig. 1;

Fig. 3 is an enlarged front elevation of a tedder plate embodying the present invention and shown in detached condition;

Fig. 4 is a top plan view thereof, and

Fig. 5 is a side elevation of the same.

The embodiment of the invention herein disclosed, by way of illustration, shows its application to a power mowing machine having a main frame (not shown) with a portion, or arm, 10 projecting forwardly in its longitudinal center line, for supporting the sickle bar. Frame portion 10 preferably has a laterally extending and broadened forward end 11 to which is secured, as by bolts 12, a sickle bar 13 having the usual forwardly extending guards 14, with ground engaging supporting shoes 15 and a guideway 16 for a sickle blade 17.

Sickle blade 17 is reciprocated by means comprising in the present instance a pair of spaced shoulders, 18, formed by the upwardly turned inner ends of a pair of short bars 19 each preferably fixed by screws or bolts, 20, directly on the upper side of the reciprocating cutter blade. Shoulders 18 are alternately engaged by an interposed roller 21 rotatably carried on a bolt 22 fixed in the forward arm 23 of a bellcrank lever indicated generally at 24. Lever 24 is pivotally mounted at its center on a bolt 25 carried by the frame portion 11 and its other arm 26 carries a bolt 27 pivotally connected with a longitudinally reciprocating rod 28 having its other end actuated by suitable driving means (not shown) such as a crank pin driven by the power mechanism on the main frame. A rearwardly extending arm 29 on the bellcrank carries a counterweight 30 for counterbalancing the forces acting on it. The mowing machine may have the above, or any other known or suitable construction, being described in an illustrative way only and forming no part of the present invention.

The tedder attachment of the present invention is preferably pressed up from sheet metal, comprising a plate 31 having a main, upright wall portion 32 and at its bottom a flat, horizontally extending, supporting flange 33. Flange 33 is formed with a plurality of bolt openings 34 for the reception of bolts for securing the flange to the upper surface of the sickle blade 17, for reciprocation therewith. The main portion of wall 32 extends substantially vertically from the flange 33 to a height at its top portion 36, preferably above the frame portion 10 and its associated parts, including the actuating connections described above for reciprocating the sickle blade. This upstanding wall has a laterally elongated shape, as shown in Fig. 3, so that it extends at its sides at least to the outer limits of the frame portion and actuating means, the tedder plate being thus substantially coextensive therewith to fully protect the same against accumulated cuttings.

The upper portion of the tedder plate on each side of its center 36 is preferably bent and inclined rearwardly and upwardly, as at 37, about a line 38 extending downwardly and outwardly from the center of its top toward the central portion of the outer side of the plate. The upper portions of the plate, on opposite sides of its center, have their upper edges turned upwardly and forwardly again and formed with a series of step-like or saw-tooth projections or shoulders 39. Each shoulder has its upper and inner side 40 extending in a substantially horizontal direction and its lower and outer side 41 extending substantially vertically. These shoulders decrease in height from the center of the plate outwardly in each direction, as shown, for a purpose to be presently described.

The plate is preferably provided on each side of its center with a second series of similar shoulders 42 which are partially cut from the plate and turned upwardly and forwardly from the line 38 on which the plate is folded. Each of these shoulders is shaped like the shoulders 39, with a substantially horizontal upper side 43 and a substantially vertical outer side 44 preferably lying intermediate the vertical shoulders 41 of the upper series of shoulders 39. The plate has an opening 45 cut through the center of its lower portion to afford clearance for the actuating means for the sickle blade.

It is evident from the above construction that as the tedder plate is reciprocated with the sickle blade, say, one inch on each side of center, the shoulders or projections 39 and 42 are first moved in one direction so that their horizontal upper edges slide under and inside of corresponding portions of the cuttings which are thus allowed to fall on the next outer and lower shoulders. As the shoulders are then moved in the opposite direction, their vertical edges engage laterally against and positively move the deposited cuttings outwardly and downwardly, so as to progressively shoulder and discharge them beyond the sides of the supporting frame portion and actuating connections. Any accumulation of cuttings is thus actively and positively agitated, opened up and discharged laterally, so as to keep the machine cleared for efficient operation and in an uninterrupted and continuous manner. Furthermore, such a tedder consists, except for its attaching bolts, of but a single part which may be readily and economically pressed up from relatively thin steel plate material, is light in weight and capable of attachment to the machine with a minmum of labor and interference with its other parts.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A tedder for a mowing machine having a main frame with a forwardly extending portion supporting a reciprocating sickle and means for reciprocating said sickle, said tedder comprising a plate provided with means for supporting the same for reciprocation in an upwardly extending position forwardly of said frame portion, said plate being substantially coextensive with the front of said frame portion and having its upper portions on opposite sides of the center thereof inclined downwardly and laterally toward the opposite sides thereof and provided on each side of the center thereof with a plurality of shoulders adapted to successively part and move the material to be cut to the opposite sides of said frame portion to clear said frame portion and means for connecting said sickle reciprocating means with said plate for reciprocating said plate.

2. A tedder for a mowing machine having a main frame with a forwardly extending portion supporting a reciprocating sickle and means for reciprocating said sickle, said tedder comprising a plate provided with means for supporting the same for reciprocation in an upwardly extending position forwardly of said frame portion, said plate being substantially coextensive with the front of said frame portion and having its upper portions on opposite sides of the center thereof inclined rearwardly about lines extending downwardly and outwardly toward the opposite sides of said plate and each provided with a series of shoulders decreasing progressively in height in an outward direction and adapted to progressively part and move the material to be cut to the opposite sides of said frame portion to clear said frame portion and means for connecting said sickle reciprocating means with said plate for reciprocating said plate.

3. A tedder for a mowing machine having a main frame with a forwardly extending portion supporting a reciprocating sickle and means for reciprocating said sickle, said tedder comprising a plate provided with means for supporting the same for reciprocation in an upwardly extending position forwardly of said frame portion, said plate being substantially coextensive with the front of said frame portion and having its upper portions on opposite sides of the center thereof inclined rearwardly about lines extending downwardly and outwardly toward the opposite sides of said plate, said rearwardly inclined portions having their upper edges inclined upwardly and forwardly and provided with a series of shoulders adapted to part and move the material to be cut to the opposite sides of said frame portion to clear said frame portion and means for connecting said sickle reciprocating means with said plate for reciprocating said plate.

4. A tedder for a mowing machine having a main frame with a forwardly extending portion supporting a reciprocating sickle and means for reciprocating said sickle, said tedder comprising a plate provided with means for supporting the same for reciprocation in an upwardly extending position forwardly of said frame portion, said plate being substantially coextensive with the front of said frame portion and having its upper portions on opposite sides of the center thereof inclined rearwardly about lines extending downwardly and outwardly toward the opposite sides of said plate, and said plate having a series of material engaging shoulders extending upwardly therefrom along said line and being adapted to part and move the material to be cut to the opposite sides of said frame portion to clear said frame portion and means for connecting said sickle reciprocating means with said plate for reciprocating said plate.

5. A tedder for a mowing machine having a main frame with a forwardly extending portion supporting a reciprocating sickle and means for reciprocating said sickle, said tedder comprising a plate provided with means for securing the same to said sickle in an upwardly extending position forwardly of said frame portion, said plate being laterally elongated and substantially coextensive with the front of said frame portion and having its upper portions on opposite sides of the center thereof inclined rearwardly about lines extending downwardly and outwardly toward the opposite sides of said plate, said rearwardly inclined portions having their upper edges inclined upwardly and forwardly, and a plurality of material engaging shoulders extending upwardly from said plate along said lines and from the upper edges of said rearwardly inclined portions, said shoulders being adapted to progressively part and move the material to be cut to the opposite sides of said frame portion to clear said frame portion as said plate is reciprocated with said sickle.

6. A tedder for a mowing machine having a main frame with a forwardly extending portion supporting a reciprocating sickle and means for reciprocating said sickle, said tedder comprising a plate provided with means for securing the same to said sickle in an upwardly extending position forwardly of said frame portion, said plate being laterally elongated and substantially coextensive with the front of said frame portion and having its upper portions on opposite sides of the center thereof inclined downwardly and laterally toward the opposite sides thereof and provided with a series of step-like projections decreasing progressively in height in an outward direction and each having substantially a horizontal inner edge and a vertical outer edge, said projections being adapted to progressively part and move the material to be cut to the opposite sides of said frame portion to clear the same as said plate is reciprocated with said sickle.

7. A tedder for a mowing machine having a main frame with a forwardly extending portion supporting a reciprocating sickle and means for reciprocating said sickle, said tedder comprising a plate provided with means for securing the same to said sickle in an upwardly extending position forwardly of said frame portion, said plate being substantially coextensive with the front of said frame portion and having its upper portions on opposite sides of the center thereof inclined rearwardly about lines extending downwardly and outwardly toward the opposite sides of said plate, and a plurality of step-like projections on said rearwardly inclined portion each having substantially a horizontal inner edge and a vertical outer edge, said projections being adapted to part and move the material to be cut to the opposite sides of said frame portion to clear the same as said plate is reciprocated with said sickle.

8. A tedder adapted to be mounted for reciprocating movement on the sickle bar of a mowing machine, said tedder comprising a substantially upright, laterally elongated metal plate having its upper portions on opposite sides of its center inclined rearwardly and upwardly and provided with laterally extending series of step-like shoulders having substantially horizontal inner sides adapted, during movement in one direction, to slide under and inside corresponding portions of the mower cuttings and having substantially vertical outer sides adapted during movement in the opposite direction to laterally and positively engage said cuttings and progressively move and discharge the same at the opposite sides of said tedder plate.

PERCY F. BROWN.